(12) United States Patent
Zhang

(10) Patent No.: US 11,822,308 B2
(45) Date of Patent: Nov. 21, 2023

(54) POLISHING TOOL WEAR AMOUNT PREDICTION DEVICE, MACHINE LEARNING DEVICE, AND SYSTEM

(71) Applicant: FANUC Corporation, Yamanashi (JP)

(72) Inventor: He Zhang, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 879 days.

(21) Appl. No.: 16/268,043

(22) Filed: Feb. 5, 2019

(65) Prior Publication Data

US 2019/0240804 A1 Aug. 8, 2019

(30) Foreign Application Priority Data

Feb. 6, 2018 (JP) .................................. 2018-019387
Dec. 26, 2018 (JP) .................................. 2018-243196

(51) Int. Cl.
*B24B 49/00* (2012.01)
*G05B 19/404* (2006.01)
(Continued)

(52) U.S. Cl.
CPC .......... *G05B 19/404* (2013.01); *B24B 49/003* (2013.01); *B24B 49/14* (2013.01);
(Continued)

(58) Field of Classification Search
None
See application file for complete search history.

(56) References Cited

U.S. PATENT DOCUMENTS 5,067,085 A * 11/1991 Wenzel ................ G05B 19/401
901/44
5,613,894 A * 3/1997 Delle Vedove ....... B24B 49/183
451/21
(Continued)

FOREIGN PATENT DOCUMENTS

CN 102073300 A 5/2011
JP 2001255921 A 9/2001
(Continued)

OTHER PUBLICATIONS

Zhang C, Yao X, Zhang J, Jin H. Tool condition monitoring and remaining useful life prognostic based on a wireless sensor in dry milling operations. Sensors. Jun. 2016; 16(6):795. (Year: 2016).*

(Continued)

*Primary Examiner* — Vincent Gonzales

(74) *Attorney, Agent, or Firm* — HAUPTMAN HAM, LLP

(57) ABSTRACT

A polishing tool wear amount prediction device, machine learning device, and system capable of predicting a wear amount of a polishing tool unit of a polishing tool during polishing are provided. The polishing tool wear amount prediction device includes a machine learning device which observes polishing condition data indicating a processing condition of polishing as a state variable indicating a current environment state and performs, based on the state variable, (Continued)

learning or prediction by using a learning model which stores a correlation of the wear amount of the polishing tool with respect to the processing condition of polishing.

12 Claims, 9 Drawing Sheets

(51) Int. Cl.
 *G06N 3/02* (2006.01)
 *G06N 20/00* (2019.01)
 *B24B 49/14* (2006.01)
(52) U.S. Cl.
 CPC .............. *G06N 3/02* (2013.01); *G06N 20/00* (2019.01); *G05B 2219/37256* (2013.01)

(56) References Cited

U.S. PATENT DOCUMENTS

| | | | |
|---|---|---|---|
| 10,160,038 B1 * | 12/2018 | Vining | .................... B23B 25/02 |
| 2001/0027354 A1 | 10/2001 | Kakino et al. | |
| 2007/0040344 A1 * | 2/2007 | Stiller | ................ B60G 17/0523 |
| | | | 280/124.16 |
| 2017/0060104 A1 | 3/2017 | Genma | |

FOREIGN PATENT DOCUMENTS

| | | |
|---|---|---|
| JP | 201745300 A | 3/2017 |
| JP | 2017205821 A | 11/2017 |
| JP | 2017205826 A | 11/2017 |

OTHER PUBLICATIONS

Wu D, Jennings C, Terpenny J, Gao RX, Kumara S. A comparative study on machine learning algorithms for smart manufacturing: tool wear prediction using random forests. Journal of Manufacturing Science and Engineering. Jul. 1, 2017;139(7). (Year: 2017).*

Wu D, Jennings C, Terpenny J, Kumara S. Cloud-based machine learning for predictive analytics: Tool wear prediction in milling. In2016 IEEE International Conference on Big Data (Big Data) Dec. 5, 2016 (pp. 2062-2069). IEEE. (Year: 2016).*

Ghosh N, Ravi YB, Patra A, Mukhopadhyay S, Paul S, Mohanty AR, Chattopadhyay AB. Estimation of tool wear during CNC milling using neural network-based sensor fusion. Mechanical Systems and Signal Processing. Available online Feb. 3, 2006; 21(1): 466-79. (Year: 2006).*

Umehara, "Tribology in Polishing Technology", Surface Technology, 1998, vol. 49, No. 9, pp. 922-927, 6pp.

* cited by examiner

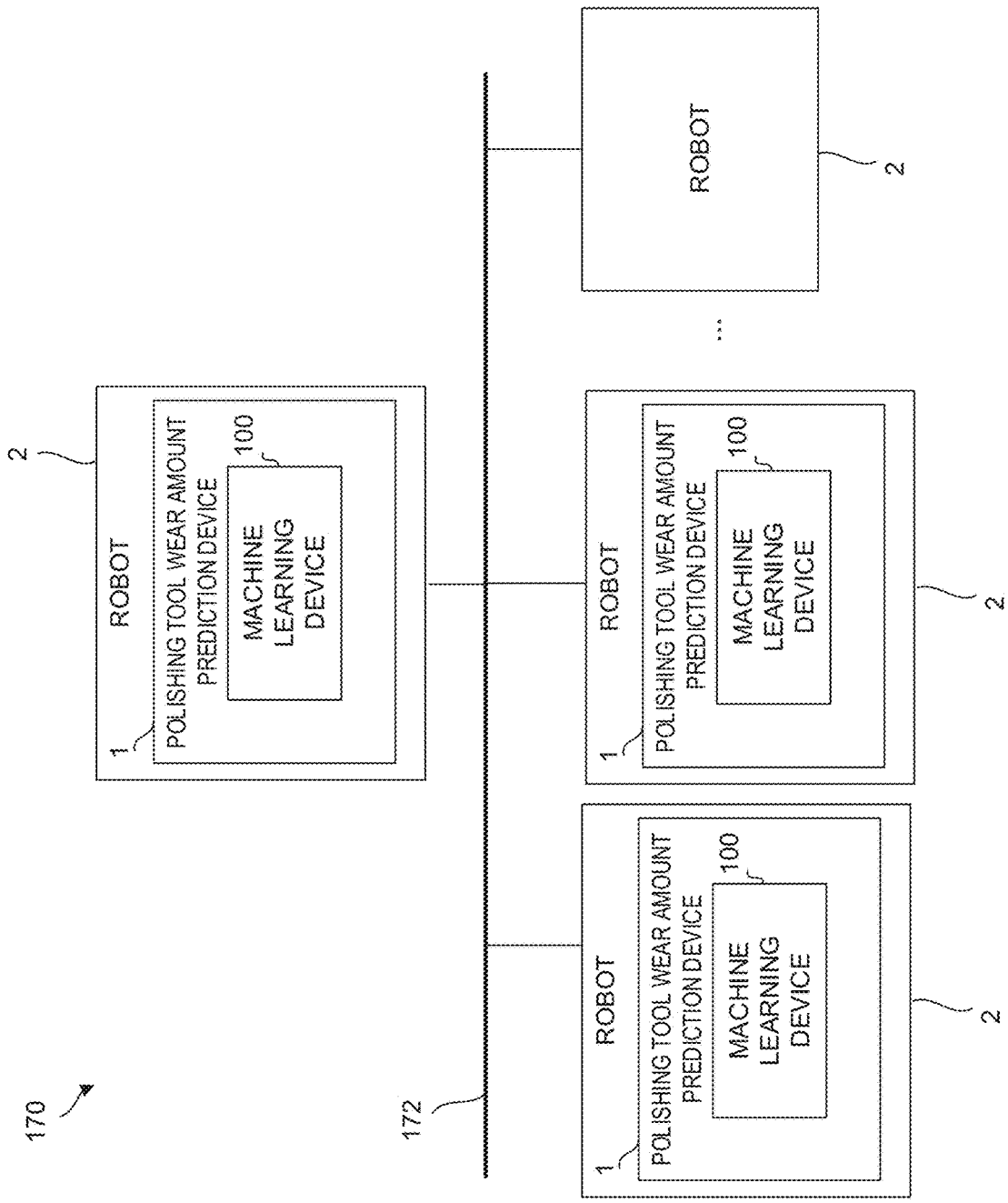

POLISHING TOOL WEAR AMOUNT PREDICTION DEVICE, MACHINE LEARNING DEVICE, AND SYSTEM

The present application claims priority to Japanese Application Number 2018-019387 filed Feb. 6, 2018, and Japanese Application Number 2018-243196 filed Dec. 26, 2018, the disclosure of which is hereby incorporated by reference herein in its entirety.

BACKGROUND OF THE INVENTION

1. Field of the Invention

The present invention relates to polishing tool wear amount prediction devices, machine learning devices, and systems.

2. Description of the Related Art

When a polishing tool is held by a robot for polishing a work, a polishing tool unit of the polishing tool is worn out by a friction force in a tangential direction occurring between the polishing tool and the work to influence accuracy of a polishing surface. Thus, in order to enhance accuracy of wok polishing, it is important to grasp a wear amount of the polishing tool unit of the polishing tool and correct the position of the polishing tool in accordance with the grasped wear amount.

In order to acquire the wear amount of the polishing tool unit of the polishing tool, the robot presses the worn-out polishing unit onto a substance, captures current position data of the robot at this time, compares the current position data with position data when the polishing unit is not worn out, and calculates a wear amount. This operation is performed every predetermined time or every defined number of operations. Note that, as a prior art technique for acquiring a wear amount of the polishing tool unit of the polishing tool by calculation, for example, "Tribology in Polishing Technology", Journal of the Surface Finishing Society of Japan, Volume 49 (1998) No. 9, pp. 922-927 by Noritsugu Umehara discloses a scheme of calculating a wear volume in metal abrasive wear.

The robot performing polishing is required to measure a wear amount of the polishing tool unit of the polishing tool every time a series of polishing operations ends or after performing the polishing operation several times. This measurement operation delays a cycle time of the entire operation, and is therefore desired to be reduced if possible.

Moreover, during the series of polishing operations, there are a plurality of locations to be polished. Since the polishing tool unit of the polishing tool is worn out little by little, the wear amount at the initial polishing location and the wear amount at the last polishing location are different from each other. Thus, it is desirable to change the wear amount at every location to be polished and correct the robot operation. However, frequent measurement of the wear amount causes a significant delay of the cycle time, and is therefore not practical. Thus, under present circumstances, it is assumed that the difference in wear amount between the initial polishing location and the last polishing location is subtle and negligible as hardly affecting quality of polishing.

By applying the scheme of calculating a wear volume in metal abrasive wear disclosed in the prior art technique, it is possible to think a method of correcting the robot operation by calculating a wear amount of the polishing tool unit of the polishing tool while performing polishing without delaying the cycle time. However, in the scheme of the prior art technique, it is difficult to address a change of a processing condition, a change of a processing environment, and so forth during polishing. If the scheme is applied to actual polishing, it is difficult to keep sufficient accuracy.

SUMMARY OF THE INVENTION

An object of the present invention is to provide a polishing tool wear amount prediction device, machine learning device, and system capable of predicting a wear amount of a polishing tool unit of a polishing tool during polishing.

In the present invention, with the use of a machine learning device capable of finding a rule from among a large amount of data by itself and predicting predetermined information from a current state, machine learning is performed by comparing an actual wear amount of a polishing tool unit of a polishing tool and a wear amount calculated with a function including various parameters, and consecutive wear amounts are predicted, thereby solving the above-described problem.

One aspect of the present invention is directed to a polishing tool wear amount prediction device which predicts a wear amount of a polishing tool in polishing on a work by the polishing tool, and the polishing tool wear amount prediction device includes a machine learning device which observes polishing condition data indicating a processing condition of the polishing as a state variable indicating a current environment state and performs, based on the state variable, learning or prediction by using a learning model which stores a correlation of the wear amount of the polishing tool with respect to the processing condition of polishing.

Another aspect of the present invention is directed to a machine learning device which observes polishing condition data indicating a processing condition of polishing on a work by a polishing tool as a state variable indicating a current environment state and performs, based on the state variable, learning or prediction by using a learning model which stores a correlation of the wear amount of the polishing tool with respect to the processing condition of polishing.

Still another aspect of the present invention is directed to a system with a plurality of devices mutually connected via a network, in which the plurality of devices include a first robot provided with at least a polishing tool wear amount prediction device having a machine learning device.

By the present invention, the wear state of the polishing tool can be predicted during polishing by applying machine learning. Therefore, wear amounts are continuously outputted without interruption of polishing, and the robot operation and the rotation speed of the polishing tool are dynamically corrected in accordance with the wear amounts, thereby allowing an improvement in polishing accuracy and reduction in measurement time of wear amounts.

BRIEF DESCRIPTION OF THE DRAWINGS

The above-described and other objects and features of the present invention will become apparent from the following description of the embodiments with reference to the attached drawings, in which:

FIG. 9 is a schematic functional block diagram of still another mode of the system having the polishing tool wear amount prediction device incorporated therein.

DETAILED DESCRIPTION OF THE PREFERRED EMBODIMENTS

Figure 1:
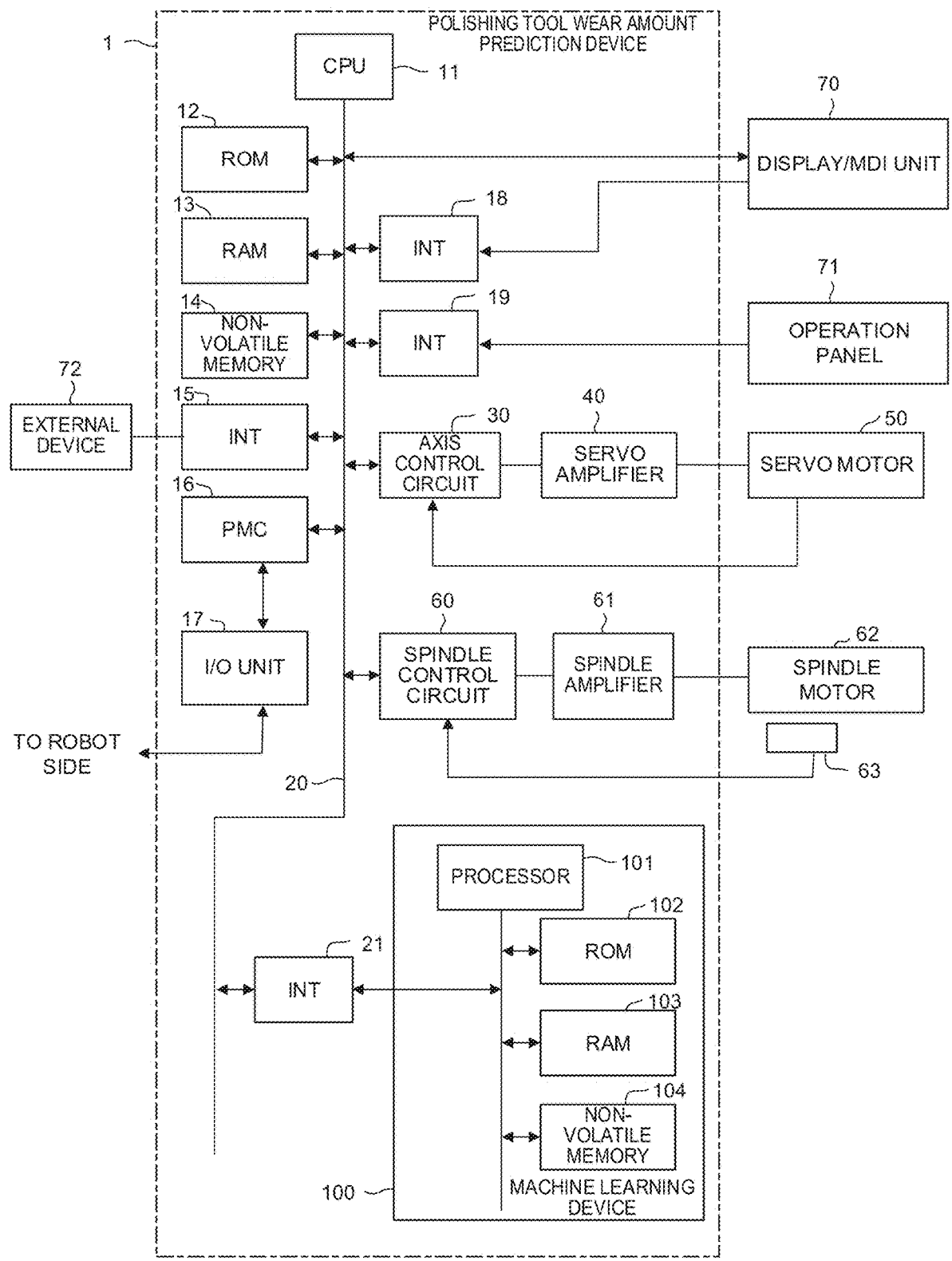
FIG. 1 is a schematic diagram of hardware structure of a polishing tool wear amount prediction device according to a first embodiment.

In the following, embodiments of the present invention are described together with the drawing.

FIG. 1 is a schematic diagram of hardware structure of main parts of a polishing tool wear amount prediction device according to one embodiment. A polishing tool wear amount prediction device 1 can be implemented as a control device which controls, for example, a manufacturing machine such as a robot. Also, the polishing tool wear amount prediction device 1 can be implemented as a computer, such as a personal computer provided together with a control device which controls, for example, a manufacturing machine such as a robot, or a cell computer, edge computer, fog computer, host computer, cloud server, or the like connected via a wired/wireless network to the control device. In the present embodiment, an example is described in which the polishing tool wear amount prediction device 1 is implemented as a control device which controls a robot.

A CPU 11 included in the polishing tool wear amount prediction device 1 according to the present embodiment is a processor which performs overall control of the polishing tool wear amount prediction device 1. The CPU 11 reads a system program stored in a ROM 12 via a bus 20, and controls the entire polishing tool wear amount prediction device 1 by following the system program. In a RAM 13, temporary calculation data and display data, various kinds of data inputted by an operator via an input unit not depicted, and so forth are temporarily stored.

A non-volatile memory 14 is configured as a memory in which a storage state is retained by, for example, being backed up by a battery not depicted, even if the polishing tool wear amount prediction device 1 is powered off. In the non-volatile memory 14, programs and various kinds of data are stored. Programs are read from an external device 72 via an interface 15 or inputted via a display/MDI unit 70. Various kinds of data are acquired from each unit of the polishing tool wear amount prediction device 1 and the robot (for example, movement speed (wear speed) of a polishing tool by the robot, rotation speed of a polishing tool unit of the polishing tool, pressing force of the polishing tool unit of the polishing tool, polishing sound, polishing time, temperature of the polishing tool unit of the polishing tool, each axis position of the robot, and so forth). The programs and various kinds of data stored in the non-volatile memory 14 may be developed onto the RAM 13 at the time of execution/use. Also, in the ROM 12, various system programs such as a known analysis program (including a system program for controlling exchanges with a machine learning device 100, which will be described further below) are written in advance.

The interface 15 is an interface for connecting the polishing tool wear amount prediction device 1 and the external device 72 such as an adaptor. From an external device 72 side, programs, various parameters, and so forth are read. Also, the programs, various parameters, and so forth edited in the polishing tool wear amount prediction device 1 can be stored in external storage means via the external device 72. A programmable machine controller (PMC) 16 controls the robot and a peripheral device of the robot by outputting a signal thereto via an I/O unit 17 by a sequence program incorporated in the polishing tool wear amount prediction device 1. Also, upon receiving signals from, for example, various switches on an operation panel disposed on a main body of the robot, the PMC 16 performs necessary signal processing, and then passes the result to the CPU 11.

The display/MDI unit 70 is a manual data input device including a display, keyboard, and so forth. An interface 18 receives an instruction and data from the keyboard of the display/MDI unit 70, and then passes them to the CPU 11. An interface 19 is connected to an operation panel 71 including a manual pulse generator or the like for use when manually driving each axis.

Upon receiving an axis movement instruction amount from the CPU 11, an axis control circuit 30 for controlling each axis for moving a joint of the robot outputs an axis instruction to a servo amplifier 40. Upon receiving this instruction, the servo amplifier 40 drives a servo motor 50 for moving the axis of the robot. The axis servo motor 50 has a position/speed detector incorporated therein, feeding back a position/speed feedback signal from this position/speed detector to the axis control circuit 30 for position/speed feedback control. Note that while only one axis control circuit 30, one servo amplifier 40, and one servo motor 50 are depicted in the diagram of the hardware structure of FIG. 1, each unit is actually prepared as many as the number of axes provided to the robot as a control target (for example, six for a robot with six axes).

Upon receiving a rotation instruction to a main spindle which rotates the polishing tool unit of the polishing tool held by the robot, a spindle control circuit 60 outputs a spindle speed signal to a spindle amplifier 61. Upon receiving this spindle speed signal, the spindle amplifier 61 rotates a spindle motor 62 for the main spindle at the instructed rotation speed to drive the tool. A position coder 63 is coupled to the spindle motor 62. The position coder 63 outputs a feedback pulse in synchronization with the rotation of the main spindle, and that feedback pulse is read by the CPU 11.

An interface 21 is an interface for connecting the polishing tool wear amount prediction device 1 and the machine learning device 100. The machine learning device 100 includes a processor 101 which controls the entire machine learning device 100, a ROM 102 having a system program and so forth stored therein, a RAM 103 for temporary storage in each process regarding machine learning, and a non-volatile memory 104 for use in storage of a learning model and so forth. The machine learning device 100 can observe each piece of information that can be acquired by the polishing tool wear amount prediction device 1 via the interface 21 (for example, movement speed (wear speed) of the polishing tool by the robot, rotation speed of the polishing tool unit of the polishing tool, pressing force of the polishing tool unit of the polishing tool, polishing sound, polishing time, temperature of the polishing tool unit of the polishing tool, each axis position of the robot, and so forth). Also, upon receiving an estimated value, which is outputted from the machine learning device 100, of the wear amount of the polishing tool unit of the polishing tool, the polishing tool wear amount prediction device 1 corrects the position of each axis of the robot.

Figure 2:
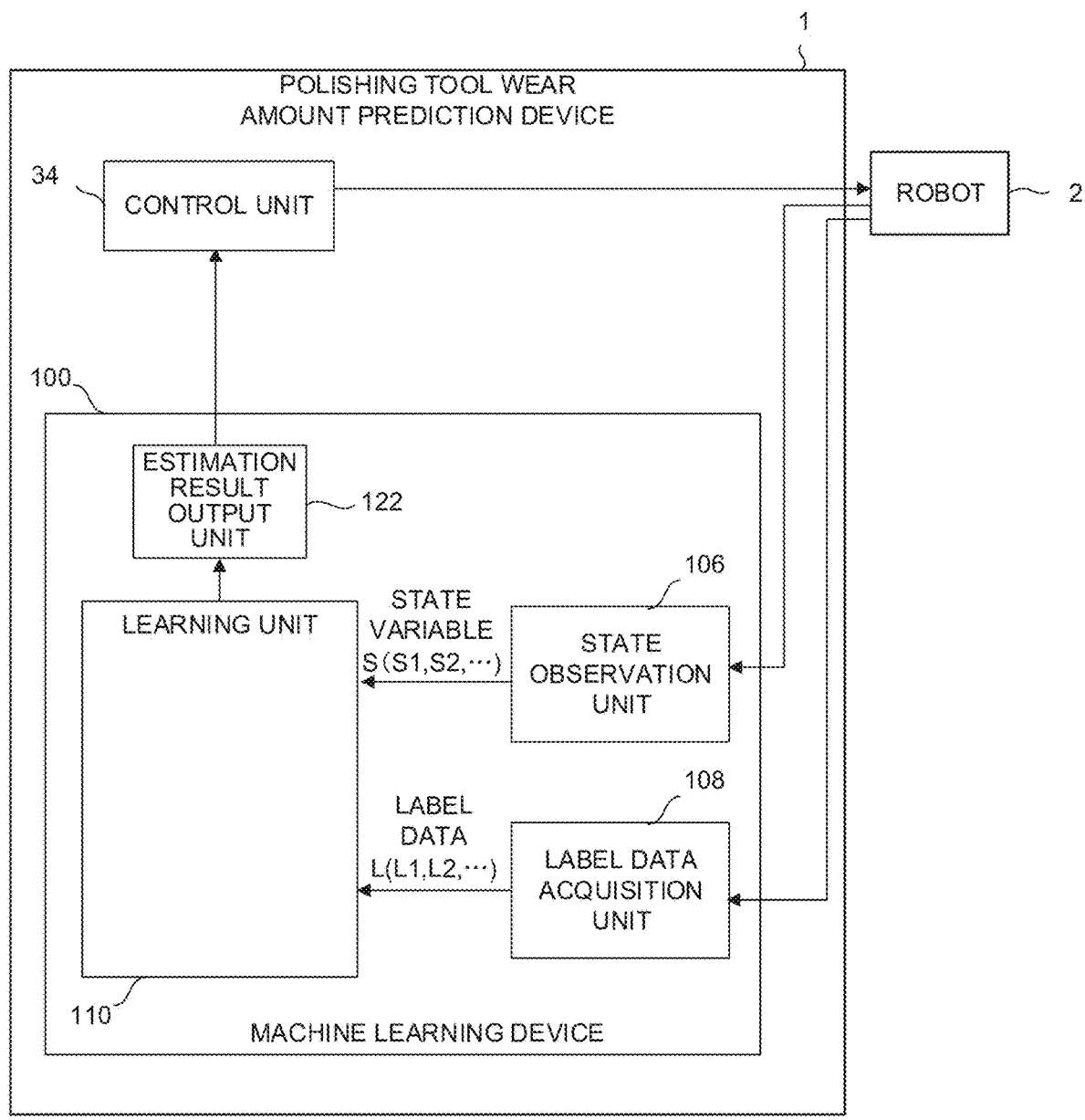
FIG. 2 is a schematic functional block diagram of the polishing tool wear amount prediction device according to the first embodiment.

FIG. 2 is a schematic functional block diagram of the polishing tool wear amount prediction device 1 and the machine learning device 100 according to a first embodiment. Each functional block depicted in FIG. 2 is achieved by the CPU 11 included in the polishing tool wear amount prediction device 1 and the processor 101 of the machine learning device 100 depicted in FIG. 1 each executing its system program and controlling the operation of each unit of the polishing tool wear amount prediction device 1 and the machine learning device 100.

The polishing tool wear amount prediction device 1 of the present embodiment includes a control unit 34 which controls the robot 2 based on the processing condition of work polishing by the polishing tool held by the robot 2 and the estimation result of the wear amount of the polishing tool unit of the polishing tool outputted from the machine learning device 100. The control unit 34 controls the operation of the robot by following the processing condition of polishing specified by, for example, a program. Also, when the wear amount of the polishing tool unit of the polishing tool is outputted from the machine learning device 100, the control unit 34 corrects the position of each axis of the robot 2 based on the wear amount so that the polishing tool unit of the polishing tool makes contact with the work at a position specified by the program or the like. Furthermore, to prevent a decrease in polishing speed when the radius of the polishing tool unit is decreased due to wear of the polishing tool unit of the polishing tool, the control unit 34 may control the polishing tool so as to correct the rotation speed of the polishing tool in accordance with the estimation result of the wear amount of the polishing tool unit of the polishing tool outputted from the machine learning device 100.

Meanwhile, the machine learning device 100 included in the polishing tool wear amount prediction device 1 includes software (such as a learning algorithm) and hardware (such as the processor 101) for learning for itself, by so-called machine learning, estimation of the wear amount of the polishing tool unit of the polishing tool with respect to the processing condition of polishing using the polishing tool by the robot 2. What is learned by the machine learning device 100 included in the polishing tool wear amount prediction device 1 corresponds to a model structure representing a correlation between the processing condition of polishing using the polishing tool by the robot 2 and the wear amount of the polishing tool unit of the polishing tool.

As depicted by the functional blocks of FIG. 2, the machine learning device 100 included in the polishing tool wear amount prediction device 1 includes a state observation unit 106, a label data acquisition unit 108, a learning unit 110, and an estimation result output unit 122. The state observation unit 106 observes a state variable S indicating a current environment state including a polishing condition data S1 indicating a processing condition of polishing using the polishing tool. The label data acquisition unit 108 acquires label data L including wear amount data L1 indicating a wear amount of the polishing tool unit of the polishing tool. The learning unit 110 learns the processing condition of polishing in association with the wear amount of the polishing tool unit of the polishing tool by using the state variable S and the label data L. The estimation result output unit 122 outputs the wear amount of the polishing tool unit of the polishing tool predicated from the processing condition of polishing by using a model learned by the learning unit 110.

The state observation unit 106 acquires the polishing condition data S1 as the state variable S from the robot 2 at the time of learning by the learning unit 110. Also, at the time of estimation of the wear amount of the polishing tool unit of the polishing tool by using the learning result of the learning unit 110, the state observation unit 106 acquires the polishing condition data S1 as the state variable S from the robot 2. Note that in either case, in place of acquiring data directly from the robot 2, data may be acquired via the non-volatile memory 14 or the like included in the polishing tool wear amount prediction device 1.

Of state variables S to be observed by the state observation unit 106, if the polishing condition data S1 is configured in the simplest manner, it is possible to use, for example, the polishing speed in polishing by the polishing tool of the robot 2 (and further the rotation speed of the polishing tool unit of the polishing tool if necessary), the pressing force of the polishing tool unit of the polishing tool onto the work, and polishing time. The polishing speed in polishing by the robot 2 may be calculated based on, for example, the moving speed of each axis of the robot 2, or may be found based on a control instruction of a program for controlling the robot 2. Also, the rotation speed of the polishing tool unit of the polishing tool in polishing by the robot 2 may be acquired, for example, from the polishing tool held by the robot 2 or may be found based on a control instruction of a program for the polishing tool held by the robot 2. The pressing force of the polishing tool unit of the polishing tool onto the work may be acquired from a sensor attached to the robot 2 or the polishing tool, or may be calculated based on a torque value of each axis of the robot 2, although accuracy is degraded. As for the polishing time, time actually taken for polishing may be acquired.

At the time of learning by the learning unit 110, the label data acquisition unit 108 acquires the label data L including the wear amount data L1 indicating the wear amount of the polishing tool unit of the polishing tool, as the label data L. The wear amount data L1 may be calculated based on, for example, the position of each axis of the robot 2 when the polishing tool unit of the polishing tool is pressed onto a predetermined location (a location where the position with respect to a base of the robot 2 is not changed, for example, a mount where the work is set). In this case, before operation of polishing, with the polishing tool unit of the polishing tool held in advance by the robot 2 being pressed onto the predetermined location, the position of each axis of the robot 2 is acquired and stored in advance as a reference axis position. Then, when the wear amount of the polishing tool unit of the polishing tool is acquired, the position of each axis of the robot 2 is acquired in a manner similar to the above, and based on a difference from the stored reference axis position, the wear amount of the polishing tool unit of the polishing tool by polishing can be calculated. The wear amount data L1 may be acquired by measuring the wear amount of the polishing tool unit of the polishing tool by polishing by using, for example, a distance sensor or, furthermore, by an operator manually measuring the wear amount of the polishing tool unit of the polishing tool by polishing and inputting the measured wear amount to the polishing tool wear amount prediction device 1. At any rate, by using any method used in prior art techniques, the wear amount of the polishing tool unit of the polishing tool by polishing can be acquired.

Note that the label data acquisition unit 108 is an indispensable component at the stage of learning by the learning unit 110 but is not necessarily an indispensable component after learning by the learning unit 110 associating the processing condition of polishing and the wear amount of the polishing tool unit of the polishing tool with each other is completed. For example, when the machine learning device 100 after learning is completed is shipped to a customer, the label data acquisition unit 108 may be removed for shipping.

The learning unit 110 learns the label data L (wear amount data L1 indicating the wear amount of the polishing tool unit of the polishing tool) with respect to the state variable S (polishing condition data S1 indicating the processing condition of polishing by using the polishing tool) by following any of learning algorithms collectively referred to as machine learning. The learning unit 110 can learn, for example, a correlation between the polishing condition data S1 included in the state variable S and the wear amount data L1 included in the label data L. The learning unit 110 can repeatedly perform learning based on a data set including the state variables S and the label data L.

In learning by the learning unit 110, a learning cycle is desirably performed a plurality of times based on the data acquired for polishing by each of a plurality of robots 2. By repeating this learning cycle, the learning unit 110 automatically interprets the correlation between the processing condition of polishing (polishing condition data S1) and the wear amount of the polishing tool unit of the polishing tool (wear amount data L1). At the start of the learning algorithm, the correlation of the wear amount data L1 with respect to the polishing condition data S1 is substantially unknown. However, as the learning unit 110 proceeds to perform learning, the relation of the wear amount data L1 with respect to the polishing condition data S1 is gradually interpreted, and the learned model acquired as a result is used, thereby allowing the correlation of the wear amount data L1 with respect to the polishing condition data S1 to be interpreted.

Based on the result of learning by the learning unit 110 (learned model), the estimation result output unit 122 estimates a wear amount of the polishing tool unit of the polishing tool based on the processing condition of polishing by the polishing tool held by the robot 2, and outputs the estimated wear amount of the polishing tool unit of the polishing tool. More specifically, the wear amount data L1 indicating the wear amount of the polishing tool unit of the polishing tool learned by the learning unit 110 in association with the polishing condition data S1 indicating the processing condition of polishing is used to predict how the position of each axis is corrected, which is an instruction for the robot 2 from the control unit 34 when polishing is performed on the work by using the polishing tool held by the robot 2. The estimation result output unit 122 may output the wear amount of the polishing tool unit of the polishing tool for each predetermined unit time defined in advance (for example, for each one or several control cycle).

As a modification example of the machine learning device 100 included in the polishing tool wear amount prediction device 1, the state observation unit 106 may observe, in addition to the polishing condition data S1, polishing sound data S2 indicating a sound occurring at the time of polishing by the polishing tool of the robot 2 as one state variable S. The polishing sound data S2 can be acquired from a sound sensor attached to, for example, the robot 2 or near the robot 2. The polishing sound data S2 may be data of main frequency components included in acquired sounds occurring at the time of polishing.

As another modification example of the machine learning device 100 included in the polishing tool wear amount prediction device 1, the state observation unit 106 may observe, in addition to the polishing condition data S1, polishing temperature data S3 indicating a temperature of the polishing tool unit of the polishing tool at the time of polishing by the polishing tool of the robot 2 as one state variable S. The polishing temperature data S3 can be acquired from, for example, a temperature sensor near the robot 2 or attached to the polishing tool. For the polishing temperature data S3, the temperature of the polishing tool may be estimated and used based on, for example, how long the polishing tool being used in polishing has been continuously used for polishing. In polishing, the wear amount of the polishing tool unit of the polishing tool at the time of polishing may be changed depending on the temperature of the polishing tool unit of the polishing tool. However, by using the temperature of the polishing tool for learning by the learning unit 110, the wear amount of the polishing tool unit of the polishing tool can be further accurately learned and estimated.

As still another modification example of the machine learning device 100 included in the polishing tool wear amount prediction device 1, the state observation unit 106 may observe, in addition to the polishing condition data S1, tool type data S4 indicating a type of the polishing tool (a type of the polishing tool unit) as one state variable S. For example, the tool type data S4 may be set in the non-volatile memory 14 in advance by the operator and acquired therefrom, or a model number or the like may be acquired directly from the polishing tool for use in polishing to identify the type of polishing tool based on the acquired model number. For each type of the polishing tool, the polishing tool unit has a different shape and material for use (such as hardness of the material). By using this, the wear amount of the polishing tool unit of the polishing tool can be further accurately learned and estimated.

As yet still another modification example of the machine learning device 100 included in the polishing tool wear amount prediction device 1, the state observation unit 106 may observe, in addition to the polishing condition data S1, processing environment data S5 indicating an environment in the polishing by the polishing tool of the robot 2 as one state variable S. As the processing environment data S5, for example, external data that may influence wear of the polishing tool at the time of polishing, such as environmental temperature and environmental moisture, can be adopted.

Figure 3:
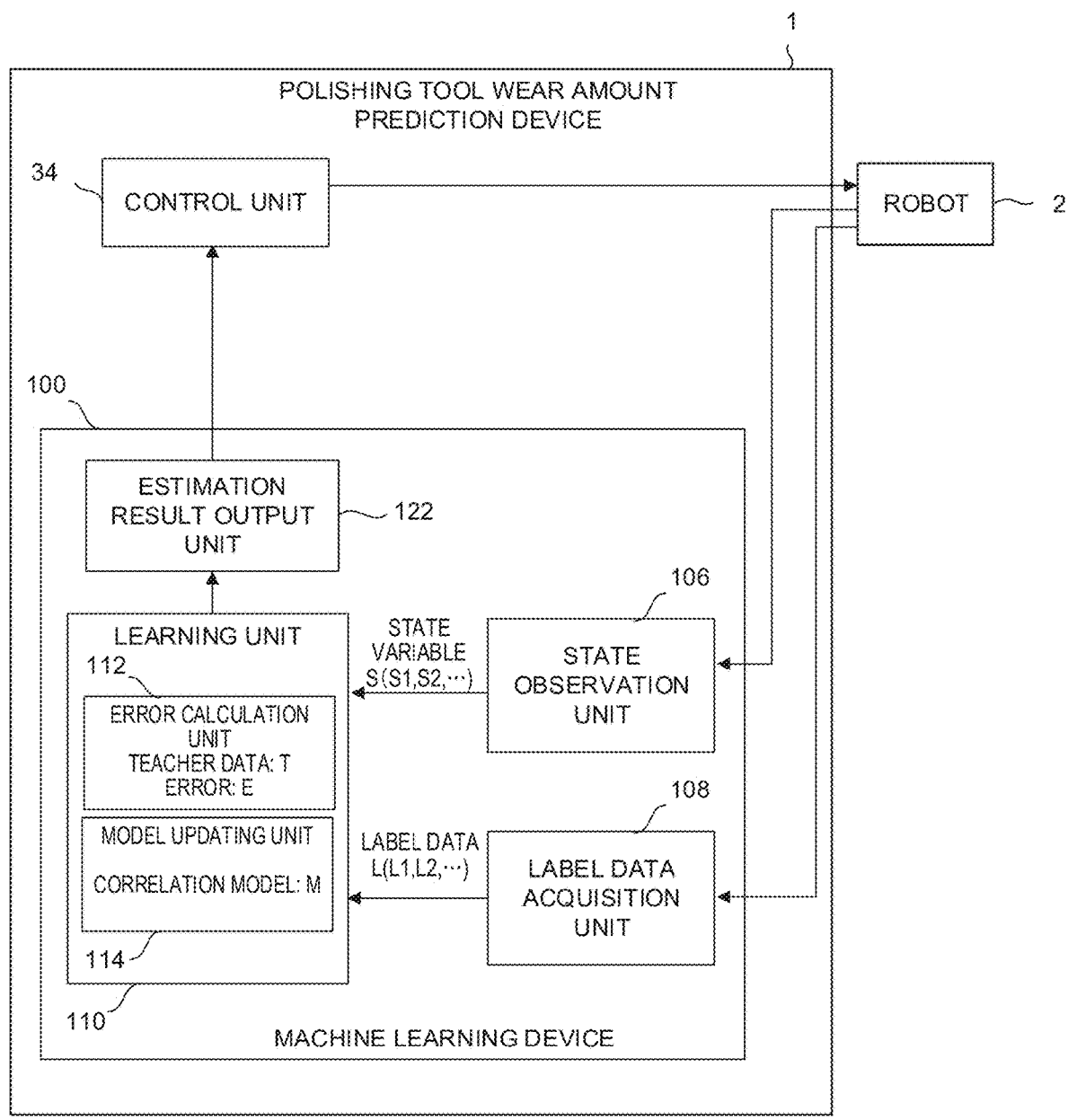
FIG. 3 is a schematic functional block diagram of one mode of the polishing tool wear amount prediction device.

In the above-structured machine learning device 100, the learning algorithm to be executed by the learning unit 110 is not particularly limited, and any learning algorithm known as machine learning can be adopted. FIG. 3 depicts another mode of the polishing tool wear amount prediction device 1 depicted in FIG. 2, and depicts a structure including a learning unit 110 which performs supervised learning as another example of the learning algorithm. Supervised learning is a technique of learning a correlation model for estimating a necessary output for a new input by being provided with known data sets of inputs and their corresponding outputs (which are referred to as teacher data) and identifying features implying a correlation between an input and an output from teacher data.

In the machine learning device 100 included in the polishing tool wear amount prediction device 1 depicted in FIG. 3, the learning unit 110 includes an error calculation unit 112 and a model updating unit 114. The error calculation unit 112 calculates an error E between a correlation model M which estimates an wear amount of the polishing tool unit of the polishing tool from a processing condition of polishing using the polishing tool and a correlation feature which is identified from teacher data T acquired from the previously-acquired data of the processing condition of polishing using the polishing tool and the actual result of wear of the polishing tool. The model updating unit 114 updates the correlation model M so as to reduce the error E. With the model updating unit 114 repeating update of the correlation model M, the learning unit 110 learns estimation of a wear amount of the polishing tool unit of the polishing tool from the processing condition of polishing using the polishing tool.

An initial value of the correlation model M represents, for example, a correlation between the state variable S and the label data L in a simplified manner (for example, by an N-th order function), and is provided to the learning unit 110 before the start of supervised learning. As described above, in the present invention, the teacher data T can be configured by using the previously-acquired data of the processing condition of polishing using the polishing tool and actual data of wear of the polishing tool, and is provided as appropriate to the learning unit 110 at the time of operation of the polishing tool wear amount prediction device 1. The error calculation unit 112 identifies a correlation feature which implies a correlation between the processing condition of polishing using the polishing tool and the wear amount of the polishing tool unit of the polishing tool from the teacher data T provided as appropriate to the learning unit 110, and finds the error E between this correlation feature and the correlation model M corresponding to the state variable S and the label data L in the current state. The model updating unit 114 updates the correlation model M so as to reduce the error E by following, for example, a predetermined update rule.

In the next learning cycle, the error calculation unit 112 estimates the wear amount of the polishing tool unit of the polishing tool by using the state variable S by following the correlation model M after the update and finds the error E between the result of the estimation and the actually-acquired label data L, and the model updating unit 114 updates the correlation model M again. In this manner, a previously-unknown correlation between the current environment state and its estimation becomes gradually apparent.

Figure 4A:
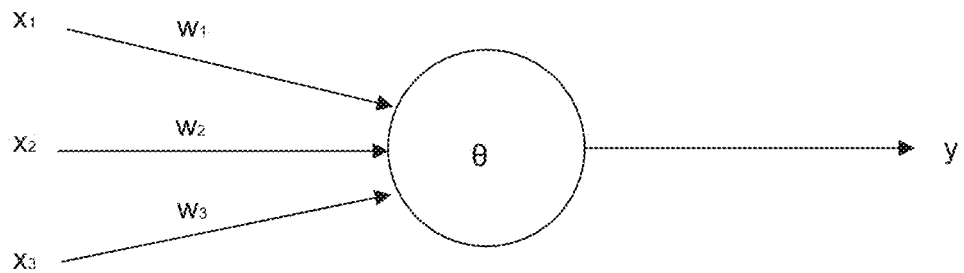
FIG. 4A is a diagram explaining a neuron.
Figure 4B:
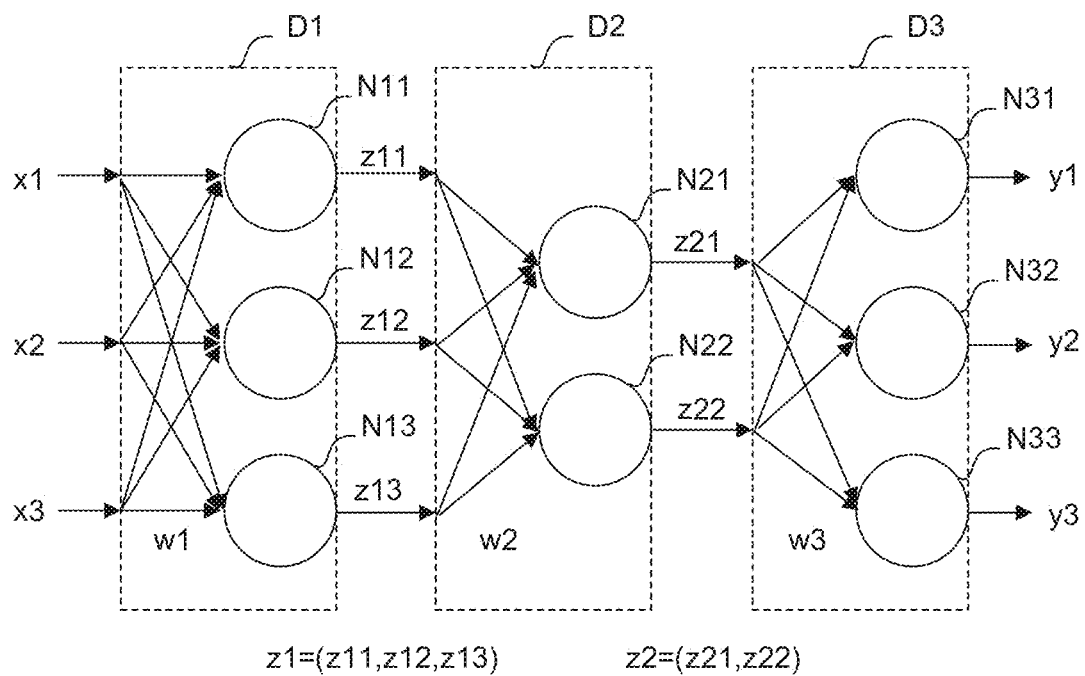
FIG. 4B is a diagram explaining a neural network.

When the above-described supervised learning is advanced, a neural network can be used. FIG. 4A schematically depicts a model of a neuron. FIG. 4B schematically depicts a model of a three-layer neural network configured by combining the neurons depicted in FIG. 4A. The neural network can be configured by, for example, a calculation device, storage, or the like which imitates the model of the neuron.

The neuron depicted in FIG. 4A outputs a result y of a plurality of inputs x (here, for example, input $x_1$ to input $x_3$). The inputs $x_1$ to $x_3$ are multiplied by weights w ($w_1$ to $w_3$) corresponding to these inputs x. As a result, the neuron outputs the output y expressed by Formula 1 given below. In Formula 1, all of the input x, the output y, and the weight w are vectors. Moreover, θ is a bias and $f_k$ is an activating function.

$$y = f_k(\Sigma_{i=1}^{n} x_i w_i - \theta)$$ [Formula 1]

A plurality of inputs x (here, for example, input x1 to input x3) are input to the three-layer neural network depicted in FIG. 4B from the left side thereof, and results y (here, for example, result y1 to result y3) are output from the right side thereof. In an example depicted in the drawing, each of the inputs x1, x2, and x3 is multiplied by a corresponding weight (generically expressed as w1) and each of the inputs x1, x2, and x3 is input to three neurons N11, N12, and N13.

In FIG. 4B, the outputs of the neurons N11 to N13 are generically expressed as z1. z1 can be regarded as a feature vector which is the extracted feature amount of an input vector. In the example depicted in the drawing, each of the feature vectors z1 is multiplied by a corresponding weight (generically expressed as w2), and each of the feature vectors z1 is input to two neurons N21 and N22. The feature vector z1 indicates a feature between the weight w1 and the weight w2.

In FIG. 4B, the outputs of the neurons N21 and N22 are generically expressed as z2. z2 can be regarded as a feature vector which is the extracted feature amount of the feature vector z1. In the example depicted in the drawing, each of the feature vectors z2 is multiplied by a corresponding weight (generically expressed as w3), and each of the feature vectors z2 is input to three neurons N31, N32, and N33. The feature vector z2 indicates a feature between the weight w2 and the weight w3. Finally, the neurons N31 to N33 respectively output the results y1 to y3.

It is also possible to use a scheme using a neural network with three or more layers, that is, so-called deep learning.

In the machine learning device 100 included in the polishing tool wear amount prediction device 1, the learning unit 110 performs computation in a multilayered structure following the above-described neural network by taking the state variables S as the inputs x, and the wear amount (outputs y) of the polishing tool unit of the polishing tool can thus be estimated from the processing conditions (inputs x) of polishing. Operation modes of the neural network include a learning mode and a value prediction mode. For example, the weights w are learned in the learning mode by using a learning data set, and value determination on behaviors can be performed in the value prediction mode by using the learned weights w. In the value prediction mode, detection, classification, inference, and so forth can also be performed.

The above-described structure of the machine learning device 100 can be written as a machine learning method (or software) with each step to be executed by the processor 101. This machine learning method is a machine learning method of learning estimation of a wear amount of the polishing tool unit of the polishing tool from the processing condition of polishing, and includes a step in which the processor 101 observes the processing condition of polishing (polishing condition data S1) as the state variable S indicating a current state, a step in which the processor 101 acquires the wear amount (wear amount data L1) of the polishing tool unit of the polishing tool as the label data L, and a step in which the processor 101 learns the polishing condition data S1 and the wear amount of the polishing tool unit of the polishing tool in association with each other by using the state variable S and the label data L.

The learned model learned and acquired by the learning unit 110 of the machine learning device 100 can be used as a program module, which is a part of software regarding machine learning. The learned model of the present invention can be used in a computer including a processor such as a CPU or GPU and a memory. More specifically, the processor of the computer operates so as to perform computation by following an instruction from the learned model stored in the memory, with the processing condition of polishing taken as an input and, based on the computation result, output an estimation result of the wear amount of the polishing tool unit of the polishing tool. The learned model of the present invention can be copied to another computer for use via an external storage medium, a network, or the like.

Also, when the learned model of the present invention is copied to another computer for use in a new environment, based on new state variables and label data acquired in that new environment, the learned model can be caused to perform further learning. In this case, a learned model derived from the learned model in that new environment (hereinafter referred to as a derived model) can be acquired. The derived model of the present invention is the same as the original learned model in that the estimation result of the wear amount of the polishing tool unit of the polishing tool is outputted based on the processing condition of polishing, but is different therefrom in that a result more suitable for the new environment than that of the original learned model is outputted. This derived model can also be copied to another computer for use via an external storage medium, a network, or the like.

Furthermore, by using the output acquired for the input to the machine learning device having the learned model of the present invention incorporated therein, a learned model acquired by learning from scratch in another machine learning device (hereinafter referred to as a distilled model) can be generated and used (this learning process is referred to as distillation). In distillation, the original learned model is referred to as a teacher model, and a newly-generated distilled model is referred to as a student model. In general, the distilled model is smaller in size than the original learned model, but can have a degree of accuracy equivalent to that of the original learned model, and is therefore more suitable for distribution to anther computer via an external storage medium, a network, or the like.

Figure 5:
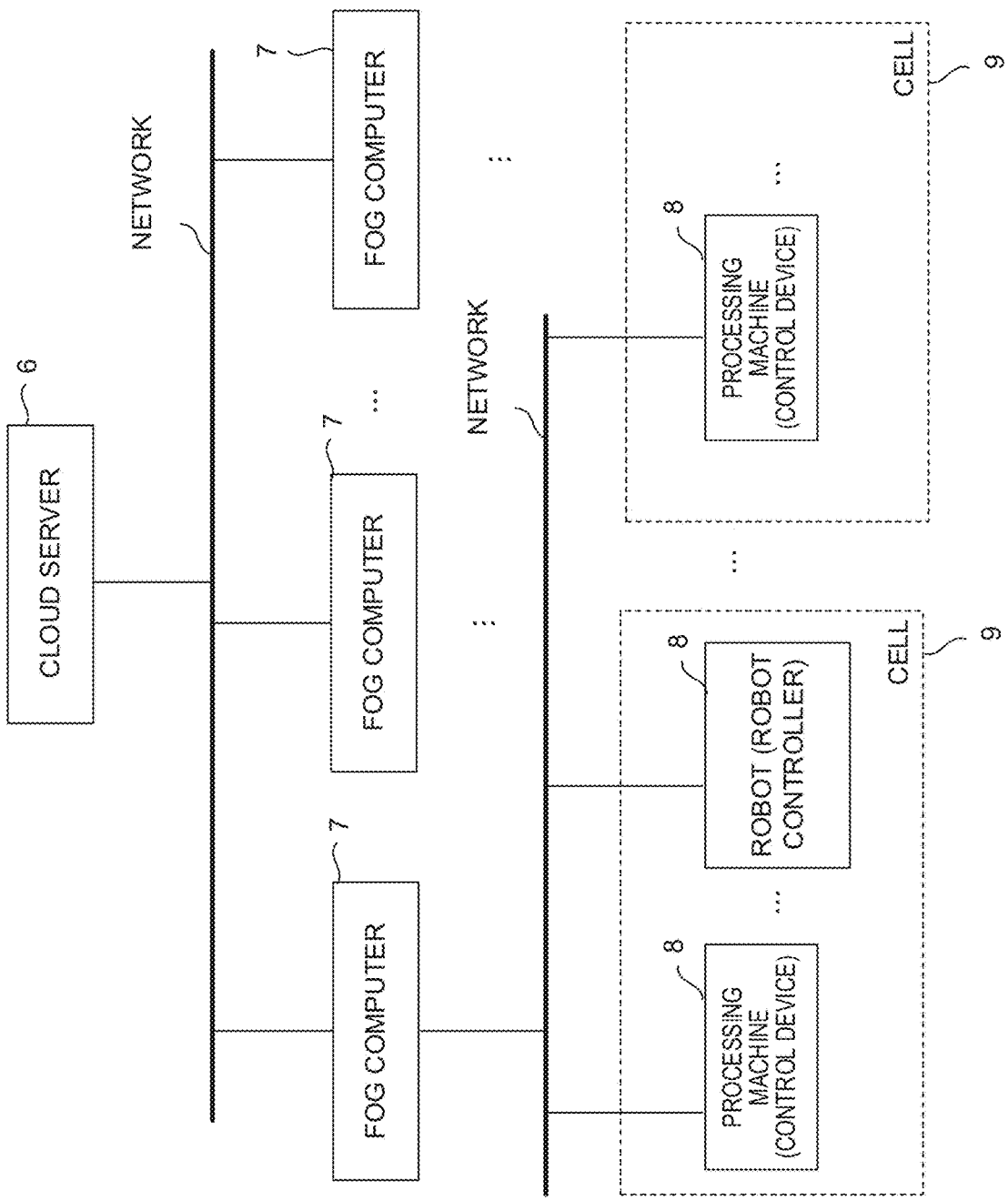
FIG. 5 is a diagram of an example of a system in a three-layer structure including a cloud server, fog computers, and edge computers.

In second to fourth embodiments described below, description is made to the case in which the polishing tool wear amount prediction device 1 according to the first embodiment is mutually connected via a wired/wireless network to a plurality of devices such as a cloud server, a host computer, a fog computer, and an edge computer (robot controller, control device, and so forth). As exemplarily depicted in FIG. 5, in the following second to fourth embodiments, a system is assumed to be logically divided into three layers, that is, a layer including a cloud server 6 and so forth with the plurality of devices each connected to the network, a layer including fog computers 7 and so forth, and a layer including edge computers 8 (robot controller included in a cell 9, control device, and so forth) and so forth. In the system as described above, the polishing tool wear amount prediction device 1 can be implemented on any of the cloud server 6, the fog computers 7, and the edge computers 8. The learning data can be shared mutually among the plurality of devices via the network for distributed learning, the generated learning model can be collected in the fog computers 7 or the cloud server 6 for large-scale analysis, and furthermore, the generated learning model can be mutually reused, for example. In a system exemplarily depicted in FIG. 5, a plurality of cells 9 are provided to each factory at many places, and the fog computers 7 on the upper layer manage the respective cells 9 in predetermined units (such as by factory or by a plurality of factories of the same manufacturer). Data collected and analyzed by these fog computers 7 is then collected, analyzed, and so forth by the cloud server 6 on the further upper layer, and the resultant information can be utilized for control of each edge computer and so forth.

Figure 6:
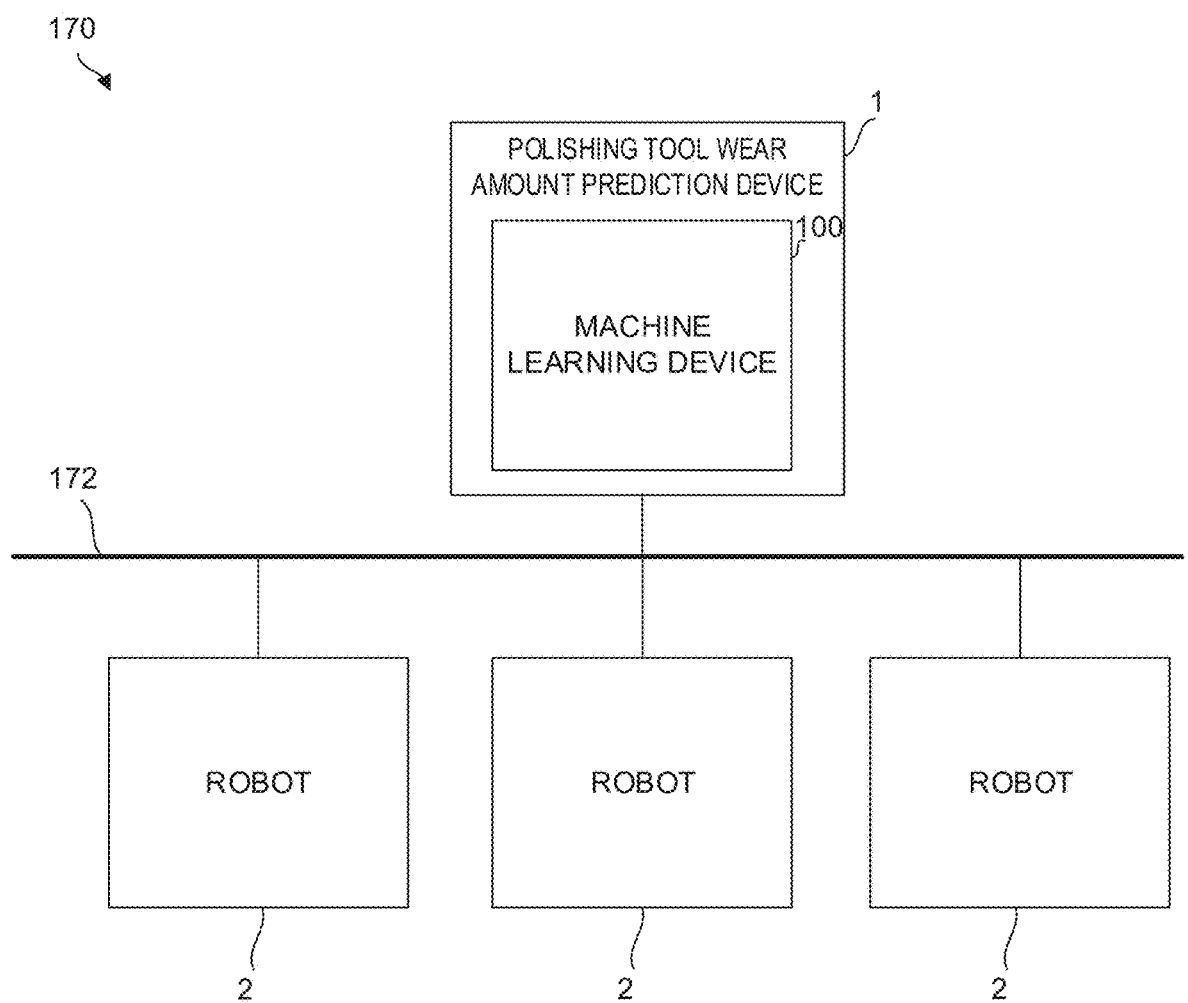
FIG. 6 is a schematic functional block diagram of one mode of a system having the polishing tool wear amount prediction device incorporated therein.

FIG. 6 depicts a system 170 according to the second embodiment that includes the polishing tool wear amount prediction device 1. The system 170 includes at least one polishing tool wear amount prediction device 1 implemented as part of a computer such as an edge computer, fog computer, host computer, or cloud server, a plurality of robots 2, and a wired/wireless network 172 which connects the polishing tool wear amount prediction device 1 and the robots 2 to one another.

In the above-structured system 170, by using the learning result of the learning unit 110, the polishing tool wear amount prediction device 1 including the machine learning device 100 can automatically and accurately find, for each robot 2, the wear amount of the polishing tool unit of the polishing tool with respect to the processing condition of polishing by each robot 2. Also, it can be configured that, based on the state variable S and the label data L acquired for each of the plurality of robots 2, the machine learning device 100 of the polishing tool wear amount prediction device 1 learns the wear amount of the polishing tool unit of the polishing tool with respect to the processing condition of polishing common to all robots 2 and the learning results can be shared in polishing by all robots 2. Therefore, according to the system 170, with more various data sets (including the state variable S and the label data L) taken as inputs, the speed and reliability of learning of the wear amount of the polishing tool unit of the polishing tool with respect to the processing condition of polishing can be improved.

Figure 7:
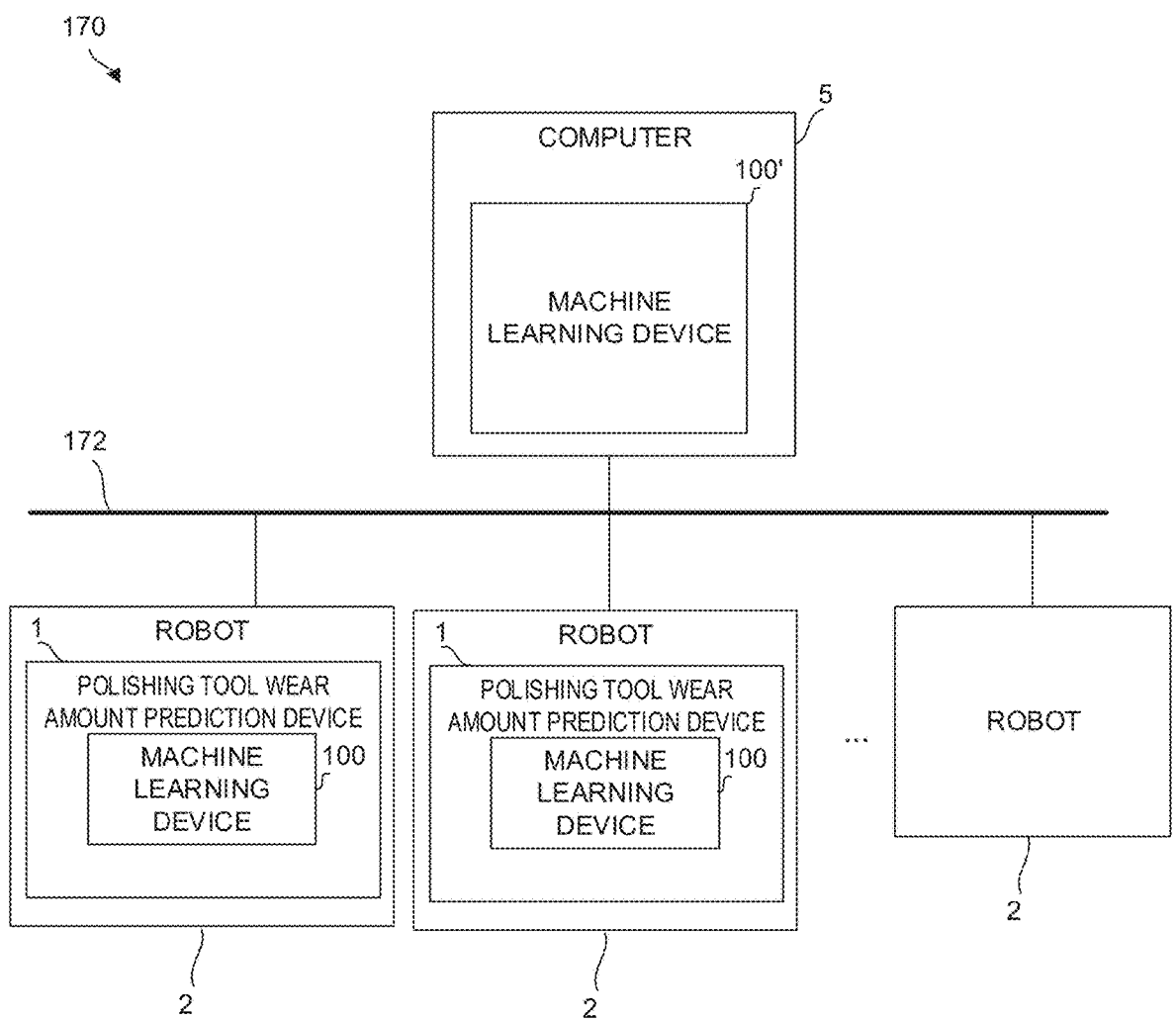
FIG. 7 is a schematic functional block diagram of another mode of the system having the polishing tool wear amount prediction device incorporated therein.

FIG. 7 depicts a system 170 according to the third embodiment that includes the polishing tool wear amount prediction device 1. The system 170 includes at least one machine learning device 100' implemented on a computer 5 such as an edge computer, fog computer, host computer, or cloud server, at least one polishing tool wear amount prediction device 1 implemented as a control device (edge computer) which controls the robots 2, and a wired/wireless network 172 which connects the computer 5 and the robots 2 to one another.

In the above-structured system 170, the computer 5 including the machine learning device 100' acquires, from the polishing tool wear amount prediction device 1 which controls each robot 2, learning models acquired as a result of machine learning by the machine learning device 100' included in the polishing tool wear amount prediction device 1. The machine learning device 100' included in the computer 5 then optimizes knowledge and performs processing for enhancing efficiency based on the plurality of these learning models to generate new optimized, efficiency-enhanced learning models, and the generated learning models are distributed to the polishing tool wear amount prediction device 1 which controls each robot 2.

An example of optimization or efficiency enhancement of learning models performed by the machine learning device 100' is generation of a distilled model based on a plurality of learning models acquired from each polishing tool wear amount prediction device 1. In this case, the machine learning device 100' according to the present embodiment generates input data to be inputted to the learning models and then learns from scratch by using an output acquired as a result of inputting the input data to each learning model, thereby generating a new learning model (distilled model). As described above, thus generated distilled model is more suitable for distribution to another computer via an external storage medium, a network, or the like.

Another example of optimization or efficiency enhancement of learning models performed by the machine learning device 100' can be thought as follows. That is, in the course of performing distillation on a plurality of learning models acquired from each polishing tool wear amount prediction device 1, an output distribution of each learning model for input data is analyzed by a general statistical scheme, outliers of sets of input data and output data are extracted, and distillation is performed by using sets of input data and output data except the outliers. By undergoing this course, exceptional estimation results are excluded from the sets of input data and output data acquired from each learning model, and a distilled model can be generated by using the sets of input data and output data with the exceptional estimation results excluded. In this manner of generation described above, a versatile distilled model for the robots 2 controlled by the polishing tool wear amount prediction devices 1 can be generated from the learning models generated by the plurality of polishing tool wear amount prediction devices 1.

Note that any of other general schemes of optimization or efficiency enhancement of learning models (such as analyzing each learning model and optimizing a hyperparameter of the learning models based on the analysis result) can be introduced as appropriate.

In the system according to the present embodiment, an example of operation is as follows. That is, the machine learning device 100' is arranged on the computer 5 as a fog computer installed for a plurality of robots 2 (polishing tool wear amount prediction devices 1) as edge computers, and learning models generated by the respective robots 2 (polishing tool wear amount prediction devices 1) are collectively stored in the fog computer, optimization and enhancement of efficiency are performed based on the plurality of stored learning models, and then the optimized, efficiency-enhanced learning models are re-distributed to each robot 2 (polishing tool wear amount prediction device 1) as required.

Also, in the system according to the present embodiment, for example, learning models collectively stored on the computer 5 as a fog computer and learning models optimized or efficiency-enhanced on the fog computer are collected onto a further upper host computer or cloud server and, by using these learning models, application to intellectual tasks at factories or the manufacturer of the robots 2 can be made (such as construction and re-distribution of further versatile learning models at an upper server, support for maintenance based on the result of analysis on the learning models, analysis on performance of each robot 2 and others, and application to new machine development).

Figure 8:
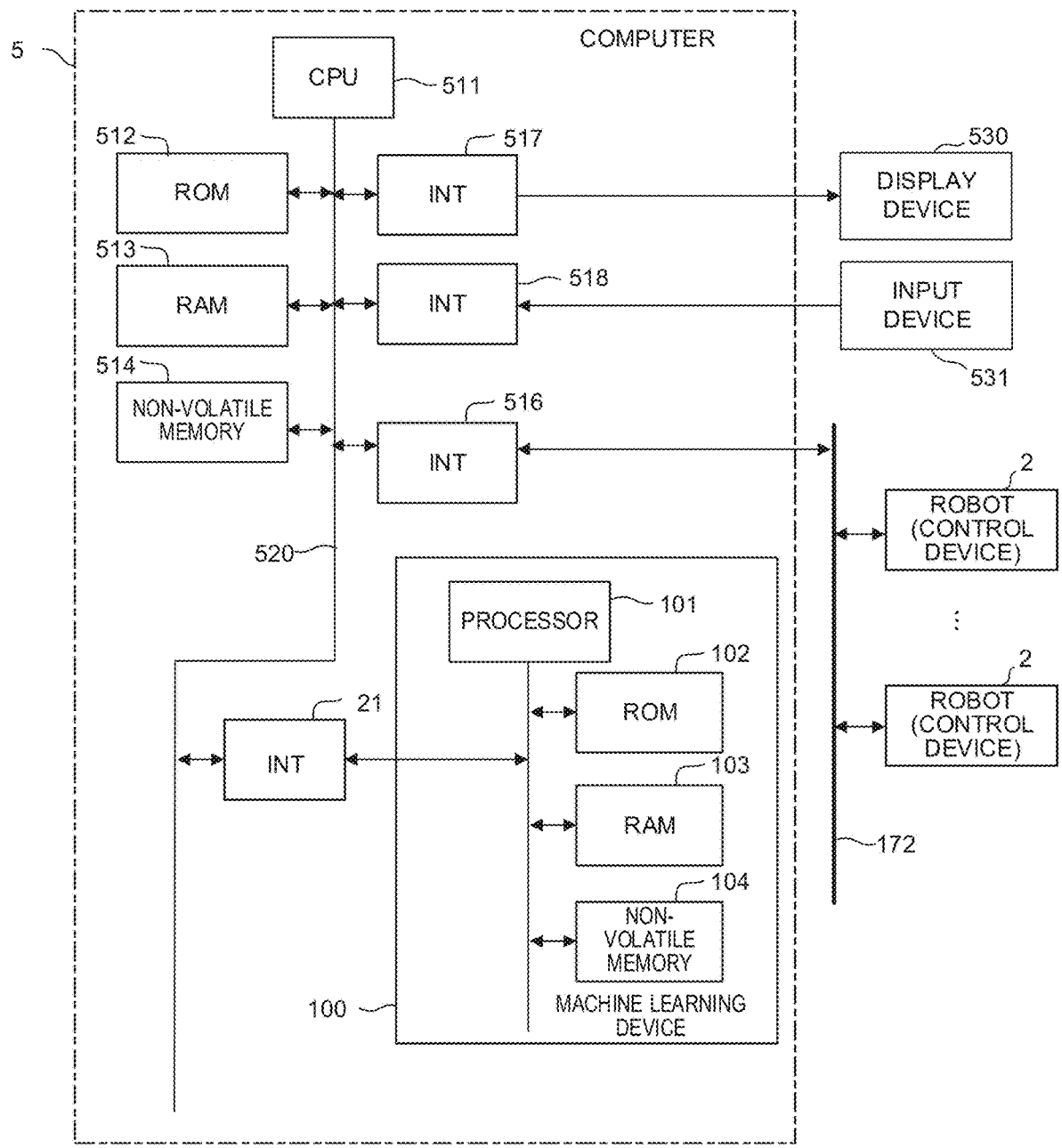
FIG. 8 is a schematic diagram of hardware structure of a computer depicted in FIG. 7.

FIG. 8 is a schematic diagram of hardware structure of the computer 5 depicted in FIG. 7.

A CPU 511 included in the computer 5 is a processor which controls the computer 5 as a whole. The CPU 511 reads a system program stored in a ROM 512 via a bus 520, and controls the entire computer 5 by following the system program. In a RAM 513, temporary calculation data, various kinds of data inputted by the operator via an input device 531, and so forth are temporarily stored.

A non-volatile memory 514 is configured of, for example, a memory, solid state drive (SSD), or the like backed up by a battery not depicted, and its storage state is retained even if the computer 5 is powered off. The non-volatile memory 514 has a setting region where setting information regarding the operation of the computer 5 is stored. In the non-volatile memory 514, data inputted from the input device 531, learning models acquired from (the control device of) each robot 2, data read via an external storage or network not depicted, and so forth are stored. Programs and various kinds of data stored in the non-volatile memory 514 may be developed onto the RAM 513 at the time of execution/use. Also in the ROM 512, a system program including a known analysis program for analyzing various kinds of data and so forth is written in advance.

The computer 5 is connected to the network 172 via an interface 516. At least one robot 2, another computer, and so forth are connected to the network 172 to mutually exchange data with the computer 5.

On a display device 530, each piece of data read onto the memory, data acquired as a result of execution of programs and so forth, and the like are outputted and displayed via an interface 517. Also, the input device 531 configured of a keyboard, pointing device, and so forth passes an instruction, data, and so forth based on operation by an operator to the CPU 511 via an interface 518.

Note that the machine learning device 100 has a hardware structure similar to that described with reference to FIG. 1, except that the machine learning device 100 is used for optimization or enhancement of efficiency of learning models in cooperation with the CPU 511 of the computer 5.

FIG. 9 depicts a system 170 according to the fourth embodiment, which includes the polishing tool wear amount prediction device 1. The system 170 includes a plurality of polishing tool wear amount prediction devices 1 implemented as a control device (edge computer) which controls the robot 2, a plurality of other robots 2 (control devices), and a wired/wireless network 172 which connects these to one another.

In the above-structured system 170, the polishing tool wear amount prediction device 1 including the machine learning device 100 performs machine learning based on state data and decision data acquired from the robot 2 as a control target and state data and decision data acquired from another robot 2 (not including the machine learning device 100) to generate a learning model. Thus generated learning model is used to estimate a wear amount of the polishing tool in polishing operation of the robot 2 controlled by the system 170, and is also used to estimate a wear amount of the polishing tool in polishing operation by (the control device) of the other robot 2 upon request from the other robot 2 not including the machine learning device 100. Also, when the polishing tool wear amount prediction device 1 including the machine learning device 100 before generation of a learning model is newly introduced, the learning model can be acquired and used from the other polishing tool wear amount prediction device 1 including the learning model via the network 172.

In the system according to the present embodiment, it is possible to share and use the data and the learning model for learning between the plurality of robots 2 (polishing tool wear amount prediction devices 1) as so-called edge computers. Therefore, efficiency of machine learning can be improved, and cost of machine learning can be reduced (for example, the machine learning device 100 is introduced only to one control device (polishing tool wear amount prediction device 1) which controls the robot 2 and is shared among other robots 2).

While the embodiments of the present invention have been described above, the present invention is not limited only to the examples of the embodiments described above and can be carried out in various aspects by being changed or modified as appropriate.

For example, the learning algorithm and the arithmetic algorithm to be executed by the machine learning device 100, the control algorithm to be executed by the polishing tool wear amount prediction device 1, and so forth are not limited to those described above, and various algorithms can be adopted.

Also in the above-described embodiments, the polishing tool wear amount prediction device 1 and the machine learning device 100 each have a different CPU. However, the machine learning device 100 may be achieved by the CPU 11 included in the polishing tool wear amount prediction device 1 and the system program stored in the ROM 12.

Also in the above-described embodiments, the structure of the polishing tool wear amount prediction device 1 is described by taking an example in which polishing is performed by using the polishing tool held by the robot 2. However, the polishing tool wear amount prediction device 1 according to the present invention can also be used to predict wear of the polishing tool in polishing by a dedicated machine for polishing, such as a so-called polishing device.

While the embodiments of the present invention have been described above, the present invention is not limited to the examples of the embodiments described above and can be carried out in another aspect by being changed or modified as appropriate.

The invention claimed is:

1. A polishing tool wear amount prediction device for predicting a wear amount of a polishing tool in polishing on a work by the polishing tool, the polishing tool wear amount prediction device comprising:
a processor configured to
observe polishing condition data indicating a processing condition of the polishing as a state variable indicating a current environment state,
perform, based on the state variable, learning by using a learning model in which the wear amount of the polishing tool is modeled with respect to the processing condition of the polishing, and
output, at each unit time during a polishing operation on the work by the polishing tool, a signal for controlling the polishing tool on the basis of a result of the learning, wherein the processor is configured to
predict the wear amount of the polishing tool based on the learning model learned by the processor, and
output the signal to a robot for correcting a position of each axis of the robot which holds the polishing tool during the polishing operation and a rotational speed of the polishing tool,
wherein the processor is further configured to
acquire wear amount data indicating the wear amount of the polishing tool due to the polishing as label data, and
generate the learning model learned with the processing condition of the polishing and the wear amount of the polishing tool in association with each other by using the state variable and the label data, and
wherein, as the state variable indicating the current environment state, the processor is further configured to observe, in addition to the polishing condition data, polishing temperature data indicating a temperature of the polishing tool in the polishing, and
at least any of
polishing sound data indicating a sound occurring in the polishing,
tool type data indicating a type of the polishing tool, and
processing environment data indicating an environment in the polishing, and
wherein the temperature data are acquired by estimating based on a combination of (1) the tool type data and (2) how long the polishing tool has been continuously used for the polishing.

2. The polishing tool wear amount prediction device according to claim 1, wherein
the processor is further configured to
calculate an error between a correlation model as the learning model for estimating the wear amount of the polishing tool from the state variable and a correlation feature identified from teacher data prepared in advance, and
update the correlation model so as to reduce the error.

3. The polishing tool wear amount prediction device according to claim 1, wherein
the processor is further configured to compute the state variable and the label data in a multilayered structure.

4. The polishing tool wear amount prediction device according to claim 1, wherein
the processor is configured to output an estimation result of the wear amount of the polishing tool based on the observed state variable and the learning model which is learned with the processing condition of the polishing and the wear amount of the polishing tool in association with each other.

5. The polishing tool wear amount prediction device according to claim 1, wherein
the processor resides in a cloud server.

6. A machine learning device, comprising at least one processor configured to
observe polishing condition data indicating a processing condition of polishing on a work by a polishing tool as a state variable indicating a current environment state,
perform, based on the state variable, learning by using a learning model in which a wear amount of the polishing tool is modeled with respect to the processing condition of the polishing, and
generate, at each unit time during a polishing operation on the work by the polishing tool, a signal for controlling the polishing tool on the basis of a result of the performed learning,
wherein the at least one processor is configured to
predict the wear amount of the polishing tool based on the learning model learned by the processor, and
output the signal to a robot for correcting a position of each axis of the robot which holds the polishing tool during the polishing operation and a rotational speed of the polishing tool,
wherein the processor is further configured to
acquire wear amount data indicating the wear amount of the polishing tool due to the polishing as label data, and
generate the learning model learned with the processing condition of the polishing and the wear amount of the polishing tool in association with each other by using the state variable and the label data, and
wherein, as the state variable indicating the current environment state, the processor is further configured to observe, in addition to the polishing condition data, polishing temperature data indicating a temperature of the polishing tool in the polishing, and
at least any of
polishing sound data indicating a sound occurring in the polishing, tool type data indicating a type of the polishing tool, and processing environment data indicating an environment in the polishing, and wherein the temperature data are acquired by estimating based on a combination of (1) the tool type data and (2) how long the polishing tool has been continuously used for the polishing.

7. The machine learning device according to claim 6, wherein the at least one processor is further configured to:

output an estimation result of the wear amount of the polishing tool based on the observed state variable, and the learning model learned with the processing condition of the polishing and the wear amount of the polishing tool in association with each other.

8. A system, comprising a plurality of devices mutually connected via a network, wherein the plurality of devices include a first robot provided with a processor for predicting a wear amount of a polishing tool in polishing on a work by the first robot using the polishing tool, wherein the processor is configured to observe polishing condition data indicating a processing condition of the polishing as a state variable indicating a current environment state, perform, based on the state variable, learning by using a learning model in which the wear amount of the polishing tool is modeled with respect to the processing condition of the polishing, and output, at each unit time during a polishing operation on the work by the polishing tool, a signal for controlling the polishing tool on the basis of a result of the learning, wherein the processor is configured to predict the wear amount of the polishing tool based on the learning model learned by the processor, and output the signal to a robot for correcting a position of each axis of the robot which holds the polishing tool during the polishing operation and a rotational speed of the polishing tool, wherein the processor is further configured to acquire wear amount data indicating the wear amount of the polishing tool due to the polishing as label data, and generate the learning model learned with the processing condition of the polishing and the wear amount of the polishing tool in association with each other by using the state variable and the label data, and wherein, as the state variable indicating the current environment state, the processor is further configured to observe, in addition to the polishing condition data, polishing temperature data indicating a temperature of the polishing tool in the polishing, and at least any of polishing sound data indicating a sound occurring in the polishing, tool type data indicating a type of the polishing tool, and processing environment data indicating an environment in the polishing, and wherein the temperature data are acquired by estimating based on a combination of (1) the tool type data and (2) how long the polishing tool has been continuously used for the polishing.

9. The system according to claim 8, wherein the plurality of devices further include a computer, and the computer is configured to acquire at least one learning model generated by the processor of the first robot, and perform optimization and enhancement of efficiency based on the acquired at least one learning model.

10. The system according to claim 8, wherein the plurality of devices further include a second robot different from the first robot, and the second robot is configured to share a result of learning by the processor included in the first robot.

11. The system according to claim 10, wherein the processor is further configured to control positions of axes of at least one of the first robot or the second robot on the basis of the output signal.

12. The system according to claim 8, wherein the plurality of devices further include a second robot different from the first robot, and the second robot is configured to provide, via the network, data observed by the second robot for learning to the processor included in the first robot.

* * * * *